United States Patent

Moriki et al.

[11] 4,233,487
[45] Nov. 11, 1980

[54] METAL BUILD-UP APPARATUS WITH IMPROVED COOLING MEANS

[75] Inventors: Yasumitsu Moriki; Izumi Takahashi; Masahiro Sakurai; Hidehiro Shimizo, all of Tokyo, Japan

[73] Assignee: Maruma Jyusharyo Kabushikigaisha, Tokyo, Japan

[21] Appl. No.: 948,840

[22] Filed: Oct. 5, 1978

[30] Foreign Application Priority Data

Jun. 23, 1978 [JP] Japan .............................. 53/87268[U]

[51] Int. Cl.³ .............................................. B23K 9/32
[52] U.S. Cl. .................................. 219/76.11; 228/46; 228/222
[58] Field of Search ................. 219/76.11; 228/46, 222

[56] References Cited

U.S. PATENT DOCUMENTS 4,103,138  7/1978  Moriki .............................. 219/76.11

Primary Examiner—E. A. Goldberg
Attorney, Agent, or Firm—Sughrue, Rothwell, Mion, Zinn and Macpeak

[57] ABSTRACT

A first contact joint screwed to the open end of a lubrication oil passage bore within the shaft of a track roller whose surface is to be rebuilt by welding material thereto, bears cooling medium inlet and outlet ports, bears an intake tube whose length is such that one end is centered axially between radial oil passages constituting branches for the oil passage bore such that a cooling medium fed to the intake terminal of an intake/exhaust sleeve borne by the first contact joint circulates through the track roller in the area of welding for maintaining the track roller surface at relatively low temperature during welding of the built-up material to the periphery of the track roller.

2 Claims, 2 Drawing Figures

METAL BUILD-UP APPARATUS WITH IMPROVED COOLING MEANS

BACKGROUND OF THE INVENTION

1. Field of the Invention

The present invention relates generally to apparatus for rebuilding worn machine elements by depositing and welding build-up metal thereon, and more particularly to an improved apparatus for cooling rotary machine components of such elements under deposition of build-up metal on the worn surface thereof for such re-building purposes.

2. The Prior Art

It is common practice to re-build various worn machine components by depositing hard build-up metal onto the worn surface of the machine elements preparatory to another extended period of use. Track rollers for engaging tracks may be considered as a typical example of such a machine element which may be re-built in this manner. In conventional practice for building-up metal onto the worn parts of track rollers, the track rollers are completely disassembled and the build-up metal is deposited onto the worn surface of the disassembled roller rims. However, this technique is not practical, because the temperature of the roller rim is elevated to a heat distortion level during the course of applying the build-up metal. Thus, the welding operation must be stopped after each single loop of the build-up metal is deposited onto the worn surface of the rotary machine element, and it is removed from the welding apparatus for cooling, or the welding operation of the build-up metal must be stopped by halves, such that the re-building operation may be shifted to another machine element while the first is cooling. Also, disassembling and re-assembling of the component parts of the track rollers is required according to past practice, which results in a considerable decrease of the working efficiency.

Another previously known technique for building-up such track rollers involves placing the roller approximately half-way into a water bath as it is in an assembled condition. However, by this technique, submerged arc welding may not be practical, and the welding areas are rendered too cool by immersion in the water bath to use a welding rod which requires preheating and gradual cooling. Also, this technique involves difficulties in the welding operation resulting from the necessity of shielding and the generation spatter and the like.

Under these circumstances, the present inventors have proposed an improved apparatus as disclosed in the specification of U.S. Pat. No. 3,895,209. This improved apparatus, capable of overcoming the aforementioned problems or drawbacks of the prior art, on the other hand poses various problems as follow.

Namely, this apparatus requires a specific cylinder incorporating a hollow rod, for holding the track rollers. At the same time, the apparatus has a complicated construction consisting of an impractically large number of parts. In addition, if the circulation of the cooling water is stopped soon after the completion of the build-up welding, the non-metallic parts such as "O" rings incorporated in the roller may be burnt down due to the residual high temperature of the roller. To avoid this, it is necessary to continue the circulation of the cooling water for at least several minutes after the completion of the welding. This considerably deteriorates the efficiency of operation of the apparatus. Further, a troublesome step of blowing air into the cooling system is required for expelling the cooling water, when the track rollers are demounted from the apparatus.

Accordingly, it is an object of the present invention to provide a cooling apparatus for permitting a worn rotary machine element to be built-up without disassembling the machine element, thereby greatly increasing the working efficiency of the re-building operation.

Another object of the present invention is to provide a cooling apparatus for permitting a worn rotary machine element to be built-up without threat of heat distortion of an internal structure of the machine element, such as seals and the surface of the machine element on which the build-up metal is to be deposited by welding.

Still another object of the present invention is to provide a cooling apparatus for enabling a worn rotary machine element to be automatically or semi-automatically built-up by arc welding, submerged arc welding, open, gas shield and so on, while the machine element is continuously rotated at a relatively slow speed in synchronism with the deposition of build-up metal onto the worn surface of the machine element.

A further object of the invention is to provide an apparatus which permits the removal of the track rollers immediately after the completion of welding, without causing any leak of cooling water.

A still further object of the invention is to provide an apparatus having a track-roller holding mechanism which is simple, small-sized and safe.

SUMMARY OF THE INVENTION

The invention contemplates an apparatus for circulating coolant through a plurality of interconnected lubricant passages including a main central lubricant passage of a rotary machine element under deposition of build-up metal by welding. The apparatus comprises a coupling coupled to a port of the central lubricant passage of the rotary machine element having an inlet tube extending axially into the central lubricant passage for providing coolant to the lubricant passages connected to the central lubricant passage.

The apparatus of the invention comprises a rotary contact joint adapted to be screwed to the central lubricating oil passage bore of the rotary machine element, a mating contact joint adapted to cooperate with the rotary contact joint, and plunger means for supporting the mating contact joint axially and rotatably movable.

The rotary contact joint has inlet and outlet ports for the cooling medium, formed therein. An intake tube, having at its end a valve adapted to be tightly fitted to the inner wall of the oil passage bore, is connected to the rotary contact joint so as to communicate the inlet port. At the same time, an intake/exhaust sleeve is rotatably secured around the rotary contact joint. This intake/exhaust sleeve has an intake terminal and an exhaust terminal which are in communication with the inlet and outlet ports of the rotary contact joint, and which also act to external intake and exhaust lines, respectively.

BRIEF DESCRIPTION OF THE DRAWING

Various other objects, features and attendant advantages of the present invention will be more fully appreciated as the same becomes better understood by reference to the following detailed description when considered in connection with the accompanying drawing, wherein like reference characters designate like or corresponding parts throughout the several Figures, and in which.

DESCRIPTION OF THE PREFERRED EMBODIMENTS

Figure 1:
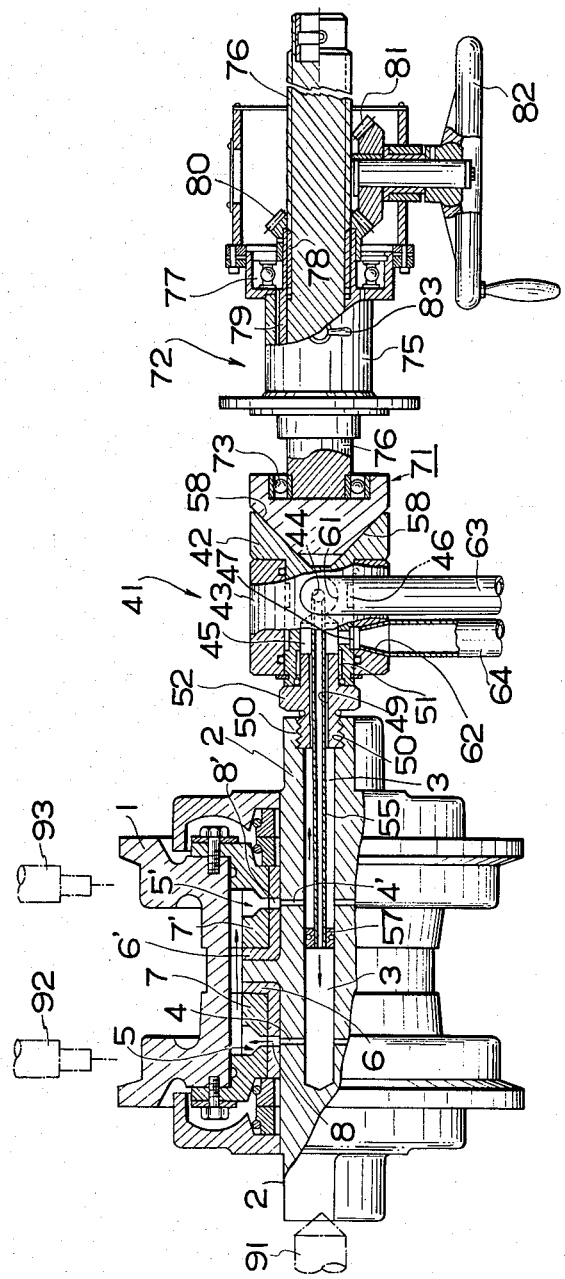
FIG. 1 is a partly sectioned schematic plan view of the apparatus in accordance with the invention.

Referring now to the drawings, which illustrate an apparatus for re-building track rollers used in bulldozers, tractors and the like as a specific example of the present invention.

A track roller body which is to be subjected to the re-building is designated at reference numeral 1. Reference numeral 2 denotes a rotary shaft. An oil passage bore denoted by a numeral 3 is formed along the axis of the rotary shaft 2, and is opened at one end of the latter. The oil passage bore 3 has radial branch bores 4,4' which are directed to respective bearings 5,5' of the track roller. These bearings have gun-metal bushes 6,6' backed by iron bushes 7,7'. A plurality of oil passage ports 8,8' are formed in the wall of each bush.

Figure 2:
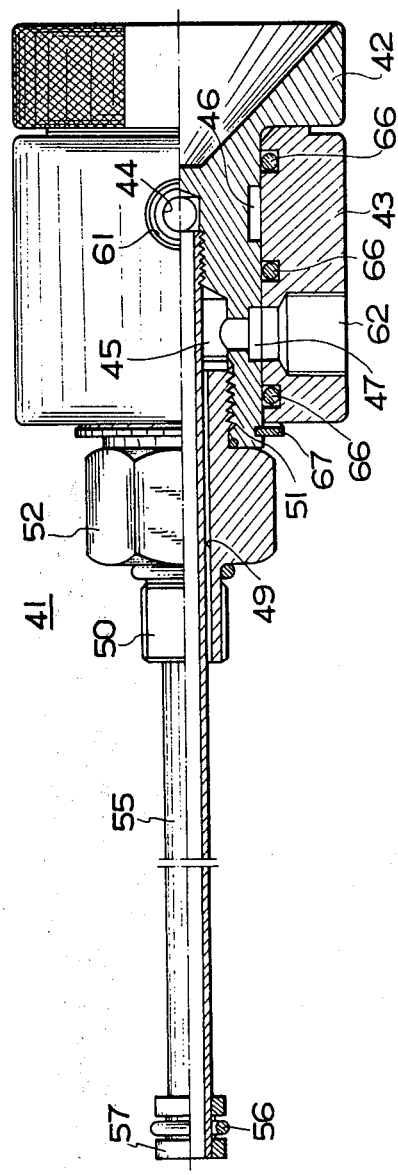
FIG. 2 is an enlarged sectional view of a part of female joint as used in the apparatus as shown in FIG. 1.

Reference numeral 41 generally denotes a female or first contact joint, while reference numeral 42 generally denotes a sleeve-like joint body. An intake/exhaust sleeve 43 is rotatably fitted around a joint body 42. As will be more clearly seen from FIG. 2, the joint body 42 has a cooling medium inlet port 44 formed in the central portion and a cooling medium outlet port 45 formed radially outside of the inlet port 44. At the same time, annular grooves 46,47, communicating respectively to the inlet and outlet ports 44,45, are formed in the peripheral surface of the joint body 42. To the opening end of the outlet port 45, is screwed a pipe joint 52 which is externally threaded at its both ends as at 50,51 and provided with a central bore 49. At the same time, an intake tube 55 is screwed to joint body 42 at the intake port 44, so as to extend through the central bore 49 of the pipe joint leaving a certain annular gap between itself and the wall of the central bore 49. The intake tube 55 extends outside of the female joint. To the end of the intake tube 55, is fixed a valve body 57 having an "O" ring which closely contacts the inner wall of the oil passage bore 3 of the rotary shaft 2 bearing track roller body 1.

The length of this intake tube 55 is so selected that the valve body 57 is positioned axially between the radial branch bores 4,4' when the pipe joint 52 is screwed to the opening end of the oil passage bore 3 of the track roller shaft 2.

At the end of the joint body 42 opposite to the pipe joint 52, is formed a contacting recess 58 having a funnel-like shape the surface of which is inclined at 30° to 330°. The intake/exhaust sleeve 43 is provided with an intake terminal 61 and an exhaust terminal 62 which are positioned to confront the annular grooves 46, respectively, 47 of the joint body, so as to communicate these grooves.

Cooling medium intake and exhaust pipes 63 and 64 are connected to the intake and exhaust terminals 61,62, respectively. Thus, the joint body 42 and the intake/exhaust sleeve 43, in combination, constitute a water-passing rotary joint or coupling. Reference numerals 66 and 67 denote, respectively, an "O" ring for preventing the water from leaking, and a snap ring for correctly positioning the intake/exhaust sleeve 43 on body 42.

A male or second contact joint designated by reference numeral 71 has a substantially conical surface opened over an angle range of 30° to 330°, mating the shape of the contacting recess 58 of the female joint 41. This male joint 71 is rotatably carried by the screw rod of plunger means 72 through the medium of a bearing 73. The plunger means 72 comprises a cylindrical casing 75 fixed to a stationary part (not shown) of the apparatus, a screw rod mounted in the casing for moving back and forth, a feed sleeve 79 rotatably carried by the casing around the screw rod 76 through the medium of a bearing 77 and provided with a screw 78 for engaging the screw rod 76, and a handle 82 operatively connected to the sleeve 79 through bevel gears 80,81 of a suitable gear reduction ratio. Therefore, the screw rod 76 is moved back and forth as the handle 82 is rotated. Reference numeral 83 denotes a clamp which is rotatably attached to the casing 75 and adapted to limit the back and forth movement of the screw rod 76.

This construction of the plunger mechanism 72 is not exclusive and any type of known hydraulic or pneumatic cylinder can be used. All what is required is to support the male joint 71 for axial and rotatable movement. A spindle for supporting the track roller is designated by numeral 91, while numerals 92,93 denote welding torches.

Hereinafter, the operation of the apparatus of the invention having the described construction will be described.

First, the intake tube 55 of the female joint 41 is inserted into the oil passage bore 3 of the shaft 2 of the track roller to be re-built, and the female joint is screwed to the opening end of the oil passage bore 3. Then, the track roller together with the female joint is set on a welding bed. This setting is made by actuating the plunger means 72 so as to drive the male joint 71 into contact with the female joint 41, while holding one end of the rotary shaft 2 of the track roller in alignment with the spindle 91.

Then, highly pressurized cooling water is fed to the intake pipe 63 at a rate of about 10 l per minute. The cooling water will then flow through the intake terminal 61 of the intake/exhaust sleeve 43, annular groove 46 of the joint body 42, intake port 44 and then through the intake tube 55, so as to be discharged into the oil passage bore 3 of the track roller. In this connection, it is to be noted that, since the valve body 57 attached to the end of the tube 55 is positioned between the radial branch bores 4,4' of the oil passage bore 3, the cooling water discharged from the end of the intake tube 55 is made to flow into the left-hand side bearing 5 through the left-hand side branch bore 4 and then transferred to the right-hand side bearing 5'. The cooling water is then returned to the oil passage bore 3 through the right-hand side branch bore 4', and further to the outlet port 45 via the outside space of the intake tube 55 and the annular gap between the wall of the bore 49 of the pipe joint 52 and the intake tube 55. The water is finally discharged externally through the exhaust terminal 62 of the sleeve 43, from the exhaust pipe 64.

Consequently, the heat transferred to the track roller in the course of the re-building welding performed by the welding torches 92,93 is conveniently carried away by the cooling water circulated in the track roller. Therefore, even the welded portion of the track roller is not heated beyond 440° C. (transformation point), so that distortion and internal strain of the track roller are fairly avoided. At the same time, since the cooling water circulated through the roller is not heated beyond 50° C., any non-metallic members such as sealing rings are not burnt out. It is therefore possible to effect the re-building continuously while rotating the roller gently, so that the efficiency of the re-building work can be improved remarkably.

After the completion of the welding, the screw rod 76 of the plunger means 72 is retracted to disengage the male joint 71 from the female joint 41, and the track roller is extracted from the apparatus together with the female joint 41 fitted thereto.

Conventionally, as explained before, it has been necessary to cool down the track roller for a while on the apparatus after the re-building welding. This troublesome and time consuming cooling step can be completely eliminated, by adopting the apparatus in accordance with the present invention. Further, by preparing a plurality of female joints 41, it becomes possible to effect a continuous rebuilding of successive rollers, so as to remarkably improve the efficiency of operation of the apparatus. In addition, it becomes unnecessary to disengage the female joint 41 from the roller while the latter is still on the apparatus, so that the undesirable wetting of the flux used in the submerged welding by leakage water is fairly avoided. The plunger means, which has only to hold the roller, can be of a simplified construction.

Further, the accidents which may be incurred by the welding electric current leaking to the plunger means can be prevented, since the latter can be electrically isolated from the welder by an electrically insulating material attached to the end of the male joint.

Further it is remarkable that only the pipe joint and the intake tube have to be replaced for different sizes and shapes of the track roller, if the apparatus is designed to incorporate the pipe joint attached to the joint body. This can considerably reduce the cost of apparatus where, as compared with the conventional apparatus the whole of which has to be replaced depending on the shape and size of the track roller.

Also, it is to be noted that the adoption of entirely mechanical plunger means can eliminate the separate hydraulic or pneumatic driving source which is essential when a hydraulic or pneumatic cylinder is used in the plunger means so that the size of the whole apparatus can be reduced. When a hydraulic cylinder or a pneumatic cylinder is used, the contacting pressure of the male joint may be accidentally lowered so as to dangerously release the track roller, due to various reasons such as a leak of the working fluid through the seal of the piston rod, power failure in the driving source or the like. However, according to the invention, such trouble is completely eliminated, because the screw rod is mechanically fixed by the clamp. In addition, the mechanical plunger means is of simple construction and can be produced at low cost. Also, thanks to the reduced number of the parts, malfunctioning is less likely to take place.

As to the welding method, it is possible to adopt open welding, not being limited to submerged welding.

Needless to say, the male and female joints of the contact joint can be replace each other. Also, it is possible to reverse the intake and exhaust passages. Further, lubricating oil which is normally used for the lubrication of the track roller may be used as the cooling medium.

What we claim is:

1. A cooling apparatus in a re-building welding machine for track rollers, said apparatus comprising:
    a track roller shaft,
    a lubrication oil passage bore extending axially in said shaft and opening at one end thereof,
    said track roller shaft further comprising axially spaced, radial oil passage branch bores opening to said axial bore, and being in fluid communication with the track roller at their radial outboard ends,
    a first contact joint,
    means for coupling said first contact joint to the open end of said track roller shaft,
    said first contact joint having cooling medium inlet and outlet ports formed therein;
    a second contact joint for cooperative axial contact with said first contact joint;
    plunger means for rotatably and axially movably supporting said second contact joint to effect contact between said first and second contact joints;
    an intake tube having at its end a valve body sealably fitted to the inner surface of said oil passage bore when said first contact joint is coupled to the open end of said shaft, said intake tube being connected to said first contact joint in communication with said inlet port;
    said first contact joint including an intake/exhaust sleeve including an intake terminal and an exhaust terminal in respective communication with said inlet and outlet ports, and wherein the length of said intake tube is such that when said first contact joint is coupled to the open end of said shaft, said valve body is positioned within said oil passage bore between said radial oil passage branch bores; whereby cooling medium may be fed through said intake terminal by means of said intake/exhaust sleeve and circulated through said track roller for cooling of said track roller during welding rebuilding.

2. The apparatus as claimed in claim 1, wherein said second contact joint comprises a casing, said plunger means comprises a screw rod mounted within said casing for axial sliding and rotatable movement, a feed sleeve is rotatably mounted within said casing and threaded thereto for screw movement within said casing, and operatively engaging said screw rod for driving said screw rod axially, and wherein said apparatus further comprises a handle rotatably mounted to said casing and gear coupled to said feed sleeve for rotating said sleeve about the axis of said screw rod.

* * * * *